(12) United States Patent
Fukai

(10) Patent No.: US 6,857,754 B2
(45) Date of Patent: Feb. 22, 2005

(54) ADJUSTMENT DEVICE OF ELECTRIC POWER MIRRORS

(75) Inventor: Akira Fukai, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 10/656,213

(22) Filed: Sep. 8, 2003

(65) Prior Publication Data

US 2004/0090691 A1 May 13, 2004

(30) Foreign Application Priority Data

Nov. 13, 2002 (JP) ......................... 2002-329098

(51) Int. Cl.⁷ .................... G02B 7/182; B60R 1/06
(52) U.S. Cl. .................... 359/872; 359/873; 359/877
(58) Field of Search .................... 359/872, 873, 359/874, 877

(56) References Cited

U.S. PATENT DOCUMENTS

| | | | | |
|---|---|---|---|---|
| 4,324,454 A | * | 4/1982 | Kumai | |
| 4,494,420 A | * | 1/1985 | Sakuma | |
| 4,498,738 A | * | 2/1985 | Kumai | |
| 4,632,525 A | * | 12/1986 | Hayashi et al. | |
| 4,678,295 A | * | 7/1987 | Fisher | |
| 4,696,555 A | * | 9/1987 | Enomoto | |
| 4,867,408 A | * | 9/1989 | Ozaki | |
| 4,940,321 A | * | 7/1990 | Yoshida | |
| 5,226,034 A | * | 7/1993 | Nagayama et al. | |
| 5,274,505 A | * | 12/1993 | Nagayama et al. | |
| 5,343,333 A | * | 8/1994 | Nagayama et al. | |

FOREIGN PATENT DOCUMENTS

| | | |
|---|---|---|
| EP | 0 059 073 | 9/1982 |
| EP | 0 528 418 | 2/1993 |
| JP | 05-27304 | 2/1993 |

* cited by examiner

Primary Examiner—Ricky D. Shafer
(74) Attorney, Agent, or Firm—Oblon, Spivak, McClelland, Maier & Neustadt, P.C.

(57) ABSTRACT

An adjustment device used for electric power mirrors comprising a motor to rotate a worm wheel, an adjustment nut that can slide along the direction of the rotational axis but cannot relatively rotate against the rotation of worm wheel, and an actuator housing that has a column on which surface a screw portion is made, wherein the adjustment nut is movable along the direction normal to a plane of screw rotation of said screw portion, and the adjustment nut has a salient extending to the outer direction at the leg portion thereof and the worm wheel has stopper portion that bumps the salient of the adjustment nut so that the adjustment nut is not pulled off from the actuator housing. Therefore the mirror exchanging service can be easily done.

3 Claims, 7 Drawing Sheets

ADJUSTMENT DEVICE OF ELECTRIC POWER MIRRORS

FIELD OF THE INVENTION

This invention relates to an adjustment device used in electric power mirrors, especially, the adjustment device that has a mechanism by which the mirror can be surely reassembled in exchanging services without troubles in reassembling.

BACKGROUND OF THE INVENTION

The conventional side mirrors installed in the right and left sides of automobiles for the safety driving assistance are equipped with electric power system that enables to adjust the mirror angle carried out by means of a remote control system for the purpose of controlling by the drivers sitting in the automobile cabins (referring to the reference 1 as an example) to obtain good view angles.

Reference 1

Published Utility Model Application: JP, 05-27304, Y (1993)

The adjustment device of electric power mirror (abbreviated as an "adjustment device", hereinafter) has conventionally a mechanism shown in the FIG. 7A as a mirror holder 100 to hold a mirror (which is not drawn in the figures) can be tilted around the center of a semi-globe to which inner surface of a salient 101 formed in the holder 100 smoothly contacts and two adjustment nuts 200 (only one adjustment nut is drawn in the figures)of the mechanisms enable the mirror angle to be adjusted in the vertical plane and the horizontal plane against the front or the back direction of the automobile. More concretely, this mirror holder 100 can be tilted by means of the adjustment nuts 200 (one of the adjustment nuts is shown in FIG. 7A) installed in two positions in the mirror holder 100 so that the adjustment nuts can adjust the orientation of the mirror against the direction of the driving direction of the automobiles.

The adjustment nut has a globe-like pivot 200 formed in an end thereof and the globe pivot fits to a recess 102 which has inner-globe shape to hold the pivot 201. The other end of the adjustment nut 200 is formed into a plural of legs 202 which are elastically deformable and of which tips have nail portions 202a fitting onto the surface of the screw portion 301 of an external thread made in the actuator housing 300. Ribs 203 formed on the outer surface of the adjustment nut 200 is fitted into a trench 401 made in a worm wheel 400 and can slide therein along the trench but cannot rotate without obstruction against the worm wheel, in other wards the adjustment nut cannot relatively rotate against the rotation of worm wheel. Therefore the adjustment nut 200 can move as screw-in or screw-out in the direction of the rotation axis of the worm wheel 400 in accordance with the rotation of the worm wheel.

In this conventional construction of the adjustment device, the combining force between the nail portion 202a and the screw potion 301 is created by the elastic deformation of the legs 202 formed at an end of adjustment nut 200. However the combining force between the pivot 200 and the recess 102 that holds the pivot is stronger than the above combining force between the nail portion 202a and the screw potion 301. Therefore, when the mirror is dismounted from the mirror holder 100 in the service of mirror exchange, the adjustment nut 200 which is pulled by the mirror holder 100 tends to be put out of the screw-in position with the screw portion 301 once the mirror holder 100 is strongly pulled down in conjunction with pulling of the mirror attached to the mirror holder.

Once the adjustment nut 200 is pulled off from the screw potion 301 made in the actuator housing 300, it is necessary to disassemble the actuator housing 300 in order to put the adjustment nuts back in the screw-in position with the screw portion. Therefore, it is the problem such that the mirror exchange service needs a time-consuming work more than a simple part exchange process.

It may be possible to push the adjustment nut 200 into the screw-in position of the screw portion 301 of the actuator housing 300 by means of strong insertion force. However, the nail portion 202a may be broken due to such strong insertion force. For this insertion of the adjustment nut, it is necessary to position the rib 203 to be aligned and fitted into the trench 401 made in the worm wheel 400. This is a difficult hand work. Therefore the work needs high skill in such assembly. In addition, a rubber boot (not shown in FIG. 7A or FIG. B) that covers the surrounding portion of the adjustment nut 200 can block the sight to check the correct positioning of the rib 203 fitted into the trench 401. Therefore the reassemble work itself is difficult.

The purpose of the present invention is to offer an adjustment device that has a preventive mechanism by which the nail portion 202a in the adjustment device cannot be pulled off from the screw portion of the actuator housing even when the mirror holder is strongly pulled down in the service of the mirror exchanging.

SUMMARY OF INVENTION

According to one aspect of the present invention, an adjustment device used for electric power mirrors includes a worm wheel rotated by an actuator with a rotational axis, an adjustment nut, and an actuator housing. The adjustment nut can slide along a direction of the rotational axis but cannot relatively rotate against rotation of the worm wheel. The actuator housing has a screw portion by which the adjustment nut is assembled therewith in a fashion to be movable along a direction normal to a plane of screw rotation of the screw portion. The adjustment nut has a salient extending to an outer direction from an outer surface thereof. The worm wheel has a stopper portion which is facing to a surface of the adjustment nut and both the adjustment nut and the worm wheel are assembled in a form such that the salient and the stopper portion bump to limit the adjustment nut not to further slide on the screw portion to be pulled off from the screw portion.

PREFERRED EMBODIMENT OF THE INVENTION

Figure 1:
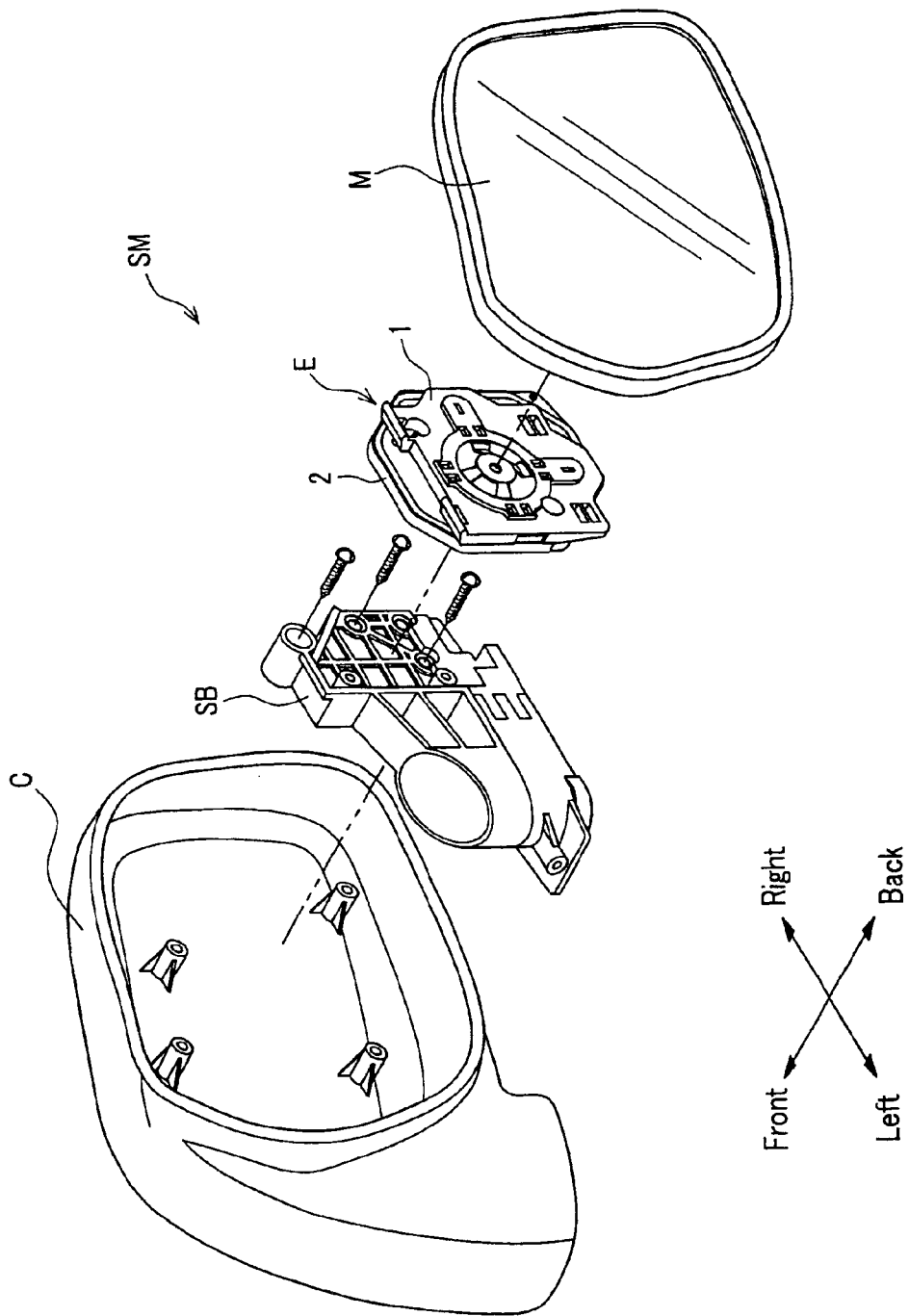
FIG. 1 is a schematic that shows a perspective view of the disassembly of a side mirror assembly SM installed in an automobile to which the adjustment device regarding to the present invention is applied.

The detail of the adjustment device regarding to this invention will be explained in referring to the drawings.

The First Embodiment

As shown in FIG. 1, the assembly of a side mirror installed in an automobile comprises a mirror M and an outer casing unit C of which room involves a supporting base 5B and an adjustment device E. The adjustment device E comprises a mirror holder 1 that hold the mirror and an actuator housing (a motor housing) 2. The arrows show the directions of front, back, right and left which are defined in reference to the normal driving direction of the automobile when the side mirror is installed in the automobile.

Figure 2:
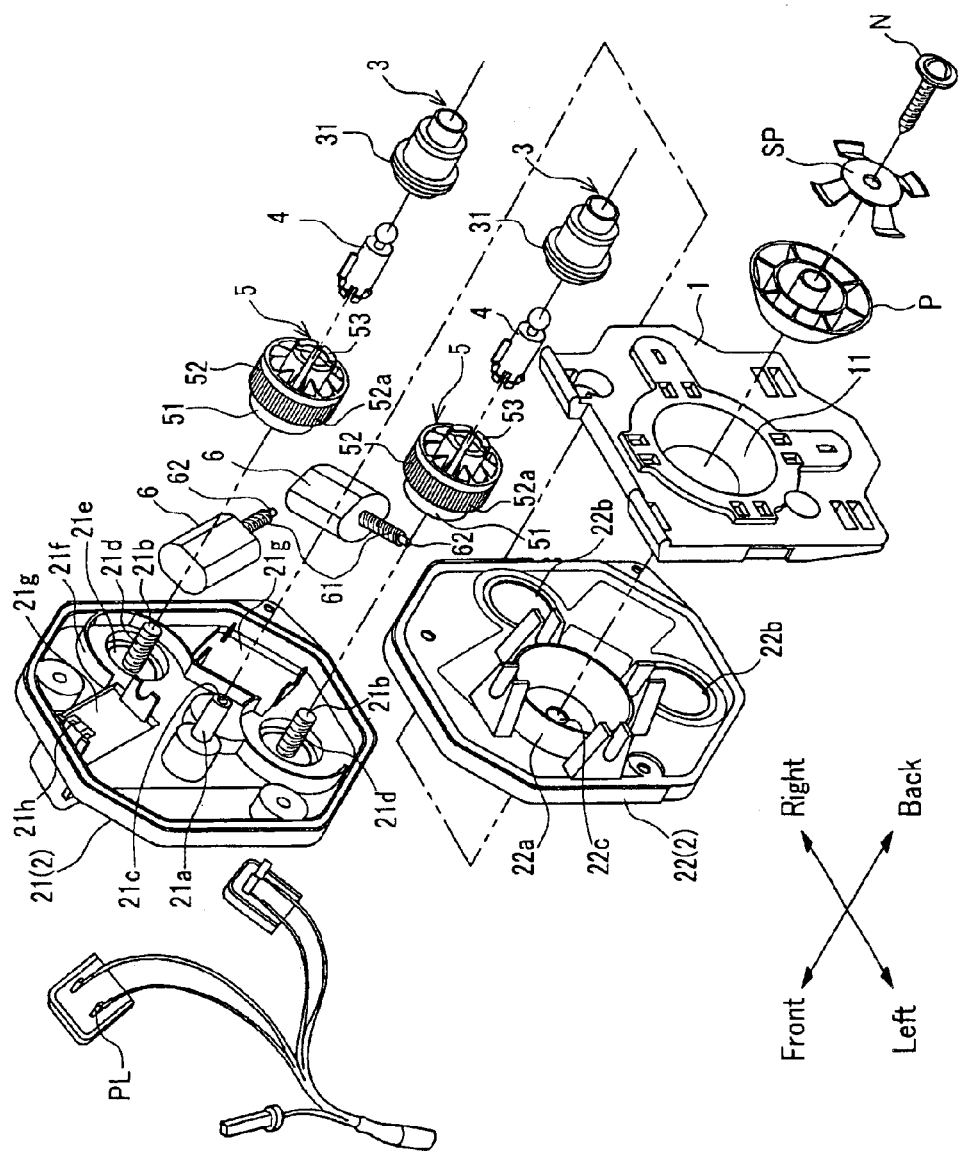
FIG. 2 is a schematic that shows a perspective view of the disassembly of the adjustment device.

As shown in FIG. 2, a mirror holder 1 is formed, using a sheet of plate, into a portion of semi-sphere that has a center of movement and supports the adjustment of the mirror angle direction relative to the automobile driving direction. The actuator 2 is constructed with a front housing 21 and the rear housing 22 and a rubber boot 3, adjustment nut 4, worm wheel 5 and two actuators 6 (two motors) are built therein.

The front housing 21 has a supporting pipe 21a of which end works as the center of adjusting the mirror angle direction and the mirror angle changing support 11 and two columns 21b at the right side and the lower side of the supporting pipe 21a. A screw surface 21c is made inside the supporting pipe 21a in a form of an internal thread at the portion which is an open end thereof. A bolt N, of which screw surface fits to the screw surface 21c of the supporting pipe 21a, is used to fix the mirror holder 1 to the front housing 21. Other screw surfaces 21d are made on the outer surfaces of the columns 21b in a form of an external thread so that the adjustment nut 4 can fit to the screw surface 21d. A recess 21e is formed to support a worm wheel 5 without the obstruction in the rotation and a rib 21f to prevent the scattering of grease is formed as well. A motor mounting potion 21g is formed to set the motor 6 in adjacent to the recess 21e and the rib 21f.

The rear housing 22 has a recessed supporting portion 22a which has a shape of a part of the inner surface of a semi-sphere by which the mirror holder 1 is movable at the mirror angle changing support 11. Circular holes 22b to which flange portions 31 of rubber boots 3 are adhesively bound are made in the right-hand side and lower side of the recessed supporting portion 22a. In the bottom side of the supporting portion 22a, a circular hole 22c is made so that the supporting pipe 21a can be inserted thereto. The supporting portion 22a is contacted with the mirror angle changing support 11 of the mirror holder 1 and a spring SP and pressing part P which has a shape of part of semi-sphere are attached to the supporting pipe 21a which extends from the circular hole 22c. A bolt N is screwed into the internal thread 21c and the mirror holder 1 is installed into the actuator 2 in a directional changeable functionality.

The rubber boot 3 is to prevent the water immersion into the actuator 2 and made of expandable elastic rubber. The flange portion 31 at an end portion has a construction of double flange and the peripheral portion of the circular hole 22b is pressed by the two flanges so that the water is sealed off and the water invasion is prevented. The other end of the rubber boot 3 is contacted with the mirror holder 1.

Figure 3:
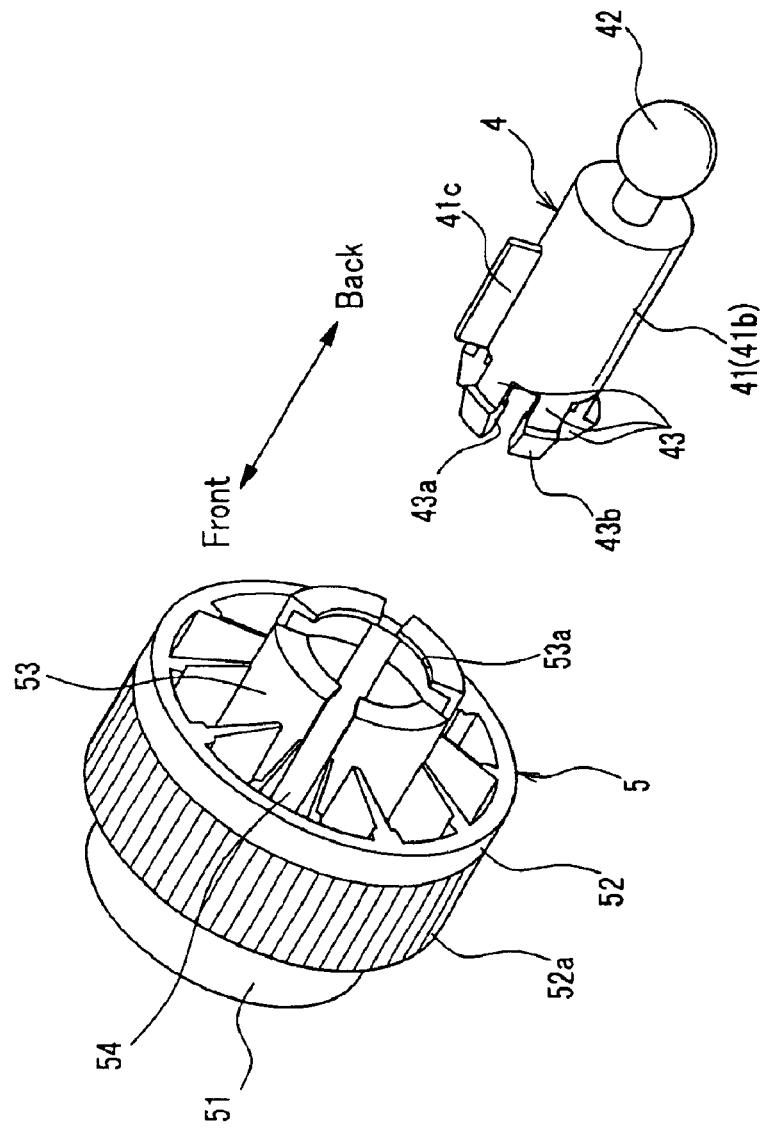
FIG. 3 is a schematic that shows a perspective view of the detail construction of the adjustment nut and the worm wheel.

The adjustment nut 4, as shown in FIG. 3, comprises a column-like main body 41, a globe-like pivot 42 which is made at a bottom of the column-like main body 41 and is fitted into the recess 12 of the mirror holder 1 (see FIG. 5) and five leg portions 43 (four of them are shown in FIG. 3). On the outer surface 41b of the main body 41, a rib 41c that extends to outside is formed in an appropriate position. At the tip of the leg portion 43, a nail portion 43a which fits onto the screw surface 21d is formed in the inner surface and a salient 43b is formed on the outer surface.

Figure 4:
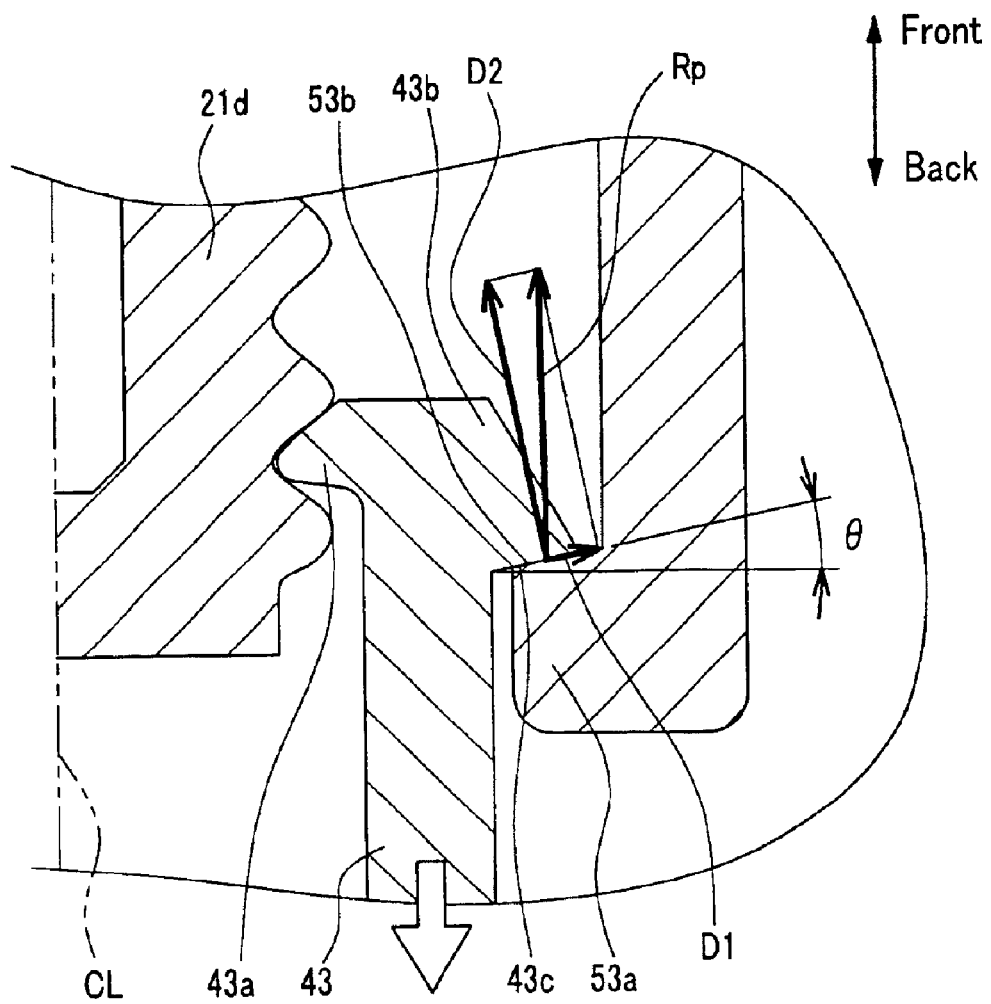
FIG. 4 is a schematic that shows the details of the status of bumping of the salient made in the adjustment nut and the stopper portion made in the worm wheel.

The salient 43b is, as shown in FIG. 4, the bumping surface 43c, which is the surface on which the salient and the stopper portion bump, has a cute angle against the surface normal to the rotation axis of the adjustment nut 4. The bump surface is a part of a cone surface of which vertex is at the side of the pivot 42 against the normal surface to the axis CL at the bumping surface position.

As shown in FIG. 2, the worm wheel 5 comprises a sliding portion 51 which has a shape of a column that slides in the recess 21e made in the front housing 21 and a column-shaped main body 52. On the outer surface of the main body 52, a gear portion 52a that fits to the worm gear 61 of the motor 6 is formed in the front part of the worm wheel and ribs 53 which directs to the inside of the worm wheel are formed in the rear part thereof. As shown in FIG. 3, four slits 54 are formed in a manner such that the rib 53 is segregated into four pieces. The slits 54 are made through the rib 53 in the back and forth direction (along the rotation axis of the worm wheel). By the fitting of the rib 41c of the adjustment nut to the slit 54, the adjustment nut 4 can move along the direction of front and back and cannot rotate against the rotation of the worm wheel.

Moreover, the rib 53 which is segregated into four pieces has a stopper portion 53a at an end thereof. As shown in FIG. 4, the stopper portion 53a is formed in such a shape that the bumping surface 53b can surface-contact to the other bumping surface 43c of the salient 43b of the adjustment nut 4. In other words, the bumping surface 53b is a part of the cone which is convex to pivot side of the adjustment nut. The angle shown in FIG. 4 is a cute angle.

As shown in FIG. 2, the rotor rod 62 of the motor 6 is formed into a worm gear 61 to rotate the worm wheel 5. The electric power is supplied to the motor 6 by a plug PL inserted through the hole 21h which is made in the motor mounting portion 21g in the front housing 21.

Figure 5A:
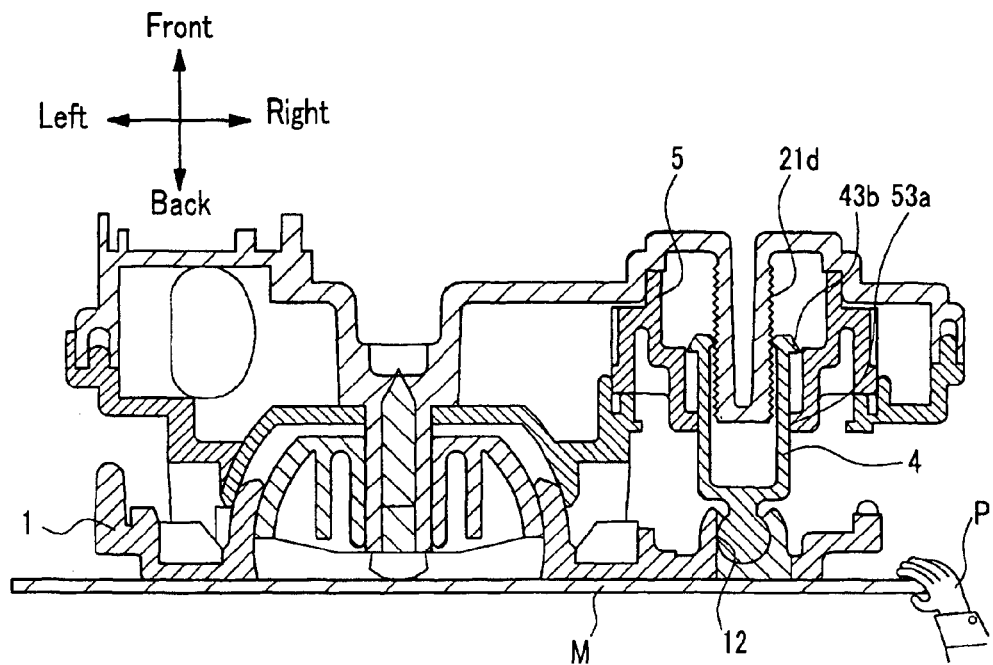
FIG. 5A and FIG. 5B are schematics that show the cut views of the adjustment nut and the worm wheel in the mirror exchanging service.
Figure 5B:
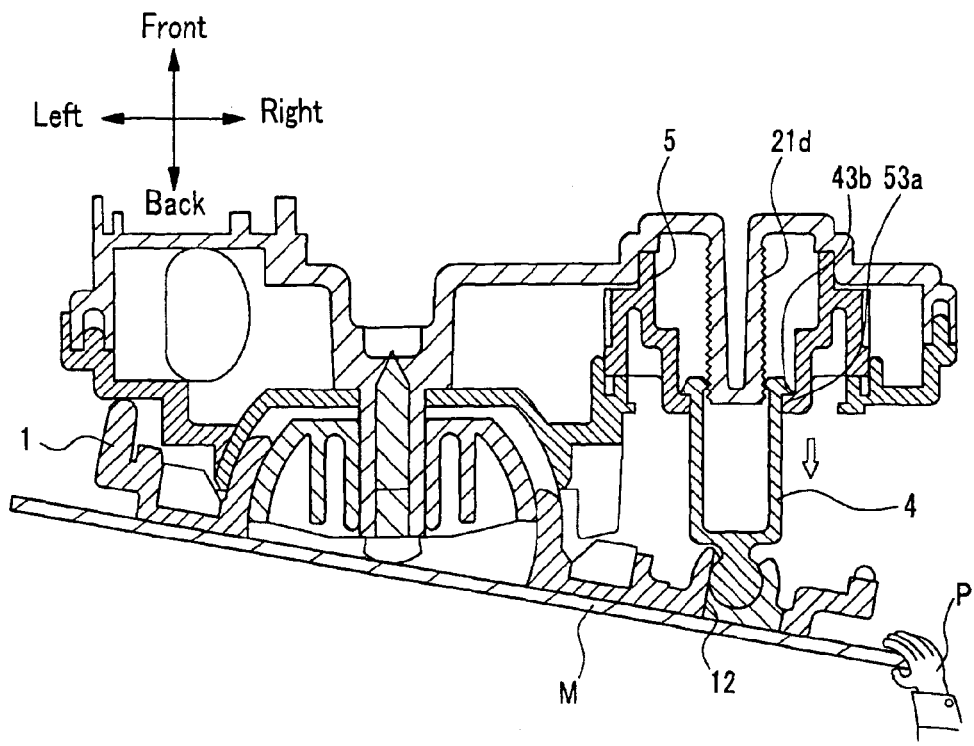

The effect of the adjustment device E to exchange the mirror M of the side mirror SM in the mirror exchanging service will be explained in details. As shown in FIG. 5A, when an operator P tries to take a mirror M by holding at the right end of the mirror M, the adjustment nut 4 is pulled in a large extent to the back direction as shown in FIG. 5B. Then the salient 43b bumps the stopper portion 53a of the worm wheel 5 and the adjustment nut is restricted in the movement of the pulling off from the worm wheel. In other words, the adjustment nuts is stopped by the bumping of the salient 43b and the stopper portion 53a in a manner that the adjustment nut is not pulled off from the external thread of screw portion 21d.

Also as shown in FIG. 4, the bumping surface 43c of the salient 43b and the bumping surface 53b of the stopper portion 53a is not normal to the pulling force direction, drag RP is composed into a small element force D1 along the bumping surfaces 43c and 53b and a large element force D2 normal to the bumping surfaces 43c and 53b. Since the element force D2 declines to the screw portion 21d, the salient 43b is pushed to the screw portion 21d in some extent and then the seizure force between the salient 43b and the screw portion 21d becomes stronger.

In the above preferred embodiment, the following effect is obtained. Once the adjustment nut 4 moves to be pulled off from the worm wheel, the salient 43b bumps to the stopper portion 53a of the worm wheel 5 and stops to move, therefore it is surely prevented that the adjustment nut 4 is pulled off from the screw portion 21d of the worm wheel. The nail portion 43a and the salient portion 43b of the adjustment nut 4 fit to the screw portion 21d and bump to the stopper portion, respectively, therefore, the movement of the adjustment nut to be pulled off from the worm wheel is restricted so that it is more sure that the adjustment nut 4 is not pulled off from the worm wheel 5. In addition, the bumping surfaces 43c and 53b between the salient 43b and the stopper portion 53a is not normal to the pulling force direction, the seizure force between the nail portion 43a and the screw portion 21d is made stronger and therefore it is further prevented that the adjustment nut 4 is pulled off from the worm wheel 5.

The Second Embodiment

Figure 6:
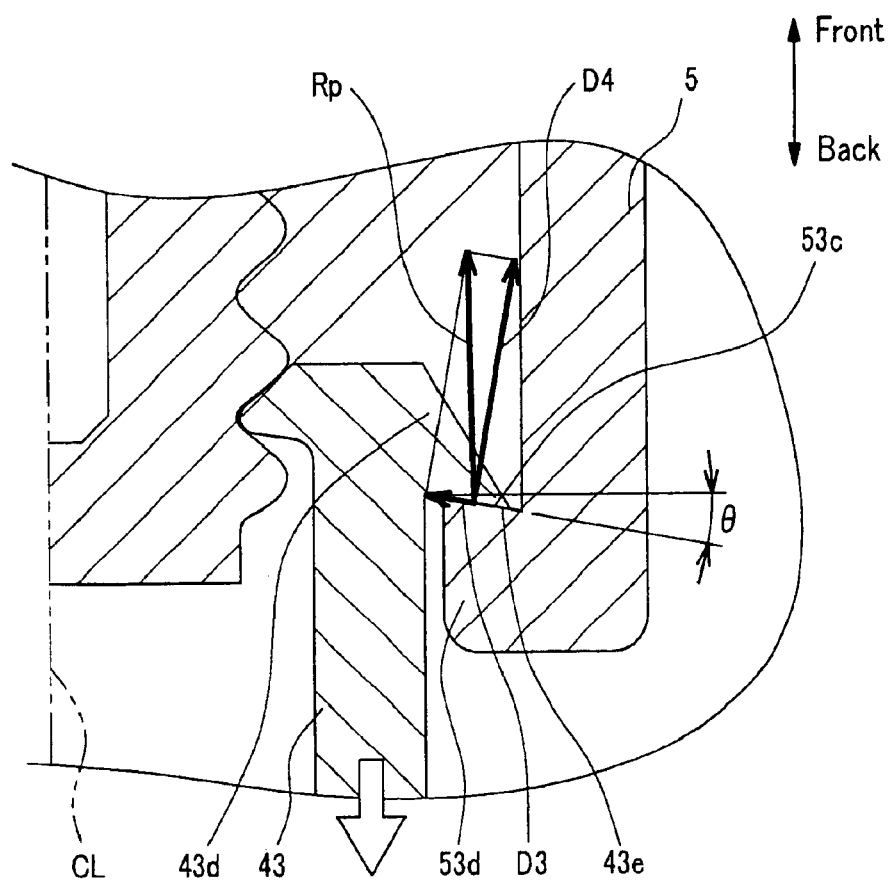
FIG. 6 is a schematic that shows the status of bumping of the salient and the stopper portion in the other embodiment regarding the present invention.
Figure 7A:
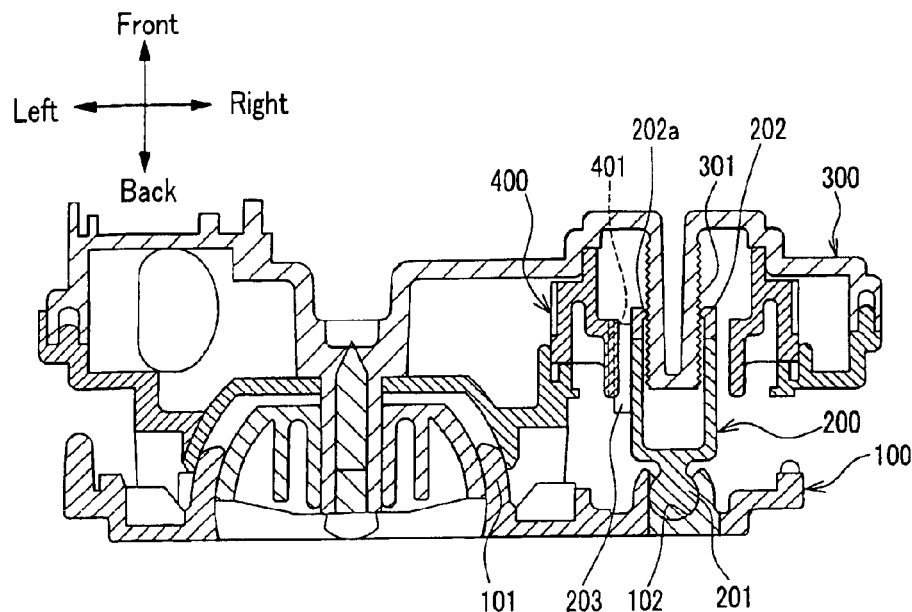
FIG. 7A and FIG. 7B are schematics that show the cut views of the conventional adjustment device in the mirror exchanging service.
Figure 7B:
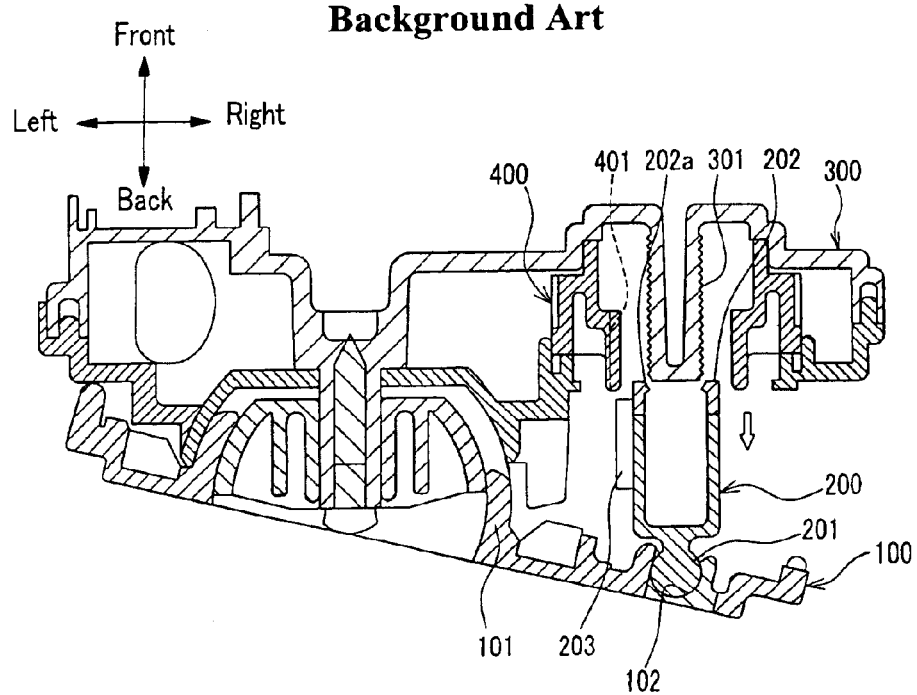

The present invention is not restricted in the first embodiment but is applied into the other embodiment. In the first embodiment the bumping surfaces 43c and 53b are a part of the surface of the cone that is convex to the side of the pivot 42 of the adjustment nut 4. The other embodiment is as shown in FIG. 6, for example, the bumping surfaces are a part of the surface of the cone that is convex to the end side where the leg portions 43 are made in the adjustment nut 4. In this case the drag force is composed into a small element force D3 along the bumping surface 43e and 53c and the a large element force D4 normal to the bumping surface 43e and 53c. Since the large element force D4 declines to the worm wheel, the salient 43d is pushed to the worm wheel 5. Then the combination force between the salient 43d and the stopper portion 53d increases and it is further prevented that the adjustment nut 4 is pulled off from the worm wheel.

In these embodiments, the adjustment device E is applied to a side mirror (or a door mirror), however this invention can be applied to other outside mirror as a fender mirror and rear under mirror installed to the upper portion of a hatchback door and the inside mirror, for example, a mirror installed at the front sealing close to a driver seat.

What is claimed is:

1. An adjustment device used for electric power mirrors comprising:

a worm wheel rotated by an actuator with a rotational axis, an adjustment nut that can slide along a direction of said rotational axis but cannot relatively rotate against rotation of said worm wheel, and an actuator housing that has a screw portion by which said adjustment nut is assembled therewith in a fashion to be movable along a direction normal to a plane of screw rotation of said screw portion, wherein;

said adjustment nut has a salient extending to an outer direction from an outer surface thereof, and said worm wheel has a stopper portion which is facing to a surface of said adjustment nut and both said adjustment nut and said worm wheel are assembled in a form such that said salient and said stopper portion bump to limit said adjustment nut not to further slide on said screw portion to be pulled off from said screw portion.

2. An adjustment device used for electric power mirrors according to claim 1, wherein;

said screw portion is made on an outer surface of a column standing on said actuator housing, a nail portion extending to an inside of said adjustment nut is made in said adjustment nut and is fitted to said screw portion, and said stopper portion is made in an inside surface of said worm wheel extending to inside direction thereof.

3. An adjustment device used for electric power mirrors according to claim 2, wherein, a bumping surface on which said salient and said stopper portion bump to limit said adjustment nut not to further slide on said screw portion to be pulled off from said screw portion is a part of a surface of a cone that has an acute angle to a plane normal to the rotation axis of said adjustment nut.

* * * * *